(12) United States Patent
Weisz et al.

(10) Patent No.: US 8,091,571 B2
(45) Date of Patent: *Jan. 10, 2012

(54) VALVE BOX, VALVE CONTROL DEVICE AND ASSEMBLY THEREOF

(75) Inventors: Edward Weisz, Toronto (CA); Jon Whiteside, Mississauga (CA)

(73) Assignee: The Water-Box Development Corporation (CA)

( * ) Notice: Subject to any disclaimer, the term of this patent is extended or adjusted under 35 U.S.C. 154(b) by 242 days.

This patent is subject to a terminal disclaimer.

(21) Appl. No.: 11/782,410

(22) Filed: Jul. 24, 2007

(65) Prior Publication Data
US 2008/0023077 A1    Jan. 31, 2008

Related U.S. Application Data

(63) Continuation-in-part of application No. 11/492,555, filed on Jul. 25, 2006, now abandoned.

(51) Int. Cl.
*F16L 5/00* (2006.01)
(52) U.S. Cl. ............ 137/1; 137/368; 137/369; 137/371; 251/292
(58) Field of Classification Search .................. 137/356, 137/357, 358, 639, 670, 363–371, 1; 251/292
See application file for complete search history.

(56) References Cited

U.S. PATENT DOCUMENTS

| | | | | | |
|---|---|---|---|---|---|
| 294,749 | A | * | 3/1884 | Abbott | 137/369 |
| 520,542 | A | * | 5/1894 | Ryan | 137/369 |
| 1,321,776 | A | * | 11/1919 | Stepanian | 81/124.2 |
| 4,572,236 | A | * | 2/1986 | Baker | 137/364 |
| 5,730,180 | A | * | 3/1998 | Alberico | 137/367 |
| 5,738,140 | A | | 4/1998 | Mann | |
| 6,321,679 | B1 | * | 11/2001 | Murrin et al. | 116/209 |
| 6,354,325 | B1 | * | 3/2002 | Warnes et al. | 137/367 |
| 6,450,479 | B1 | * | 9/2002 | Reynolds et al. | 251/291 |
| 6,802,337 | B2 | * | 10/2004 | Phipps | 137/369 |

* cited by examiner

*Primary Examiner* — John Rivell
*Assistant Examiner* — Kevin Murphy
(74) *Attorney, Agent, or Firm* — Ostrolenk Faber LLP

(57) ABSTRACT

A valve box, a valve control device, an assembly thereof and a method are provided for accessing an underground valve and indicating presence and position of the underground valve. The valve box includes a support member having a tubular section; and a resilient tubular member telescopable slidably into the tubular section of the support member. An upper end of the resilient tubular member is extendable above the ground. Various elements are disclosed for stiffening the tubular member against deformation due to forces applied to it. The valve control device comprises a control rod having one end attachable to the underground valve and a control key including a key head, a key handle and a key stem. The key head has a cone-shaped cavity and a recess portion at the top of the cavity, the recess portion being dimensioned to engage a projection at the other end of the control rod.

10 Claims, 5 Drawing Sheets

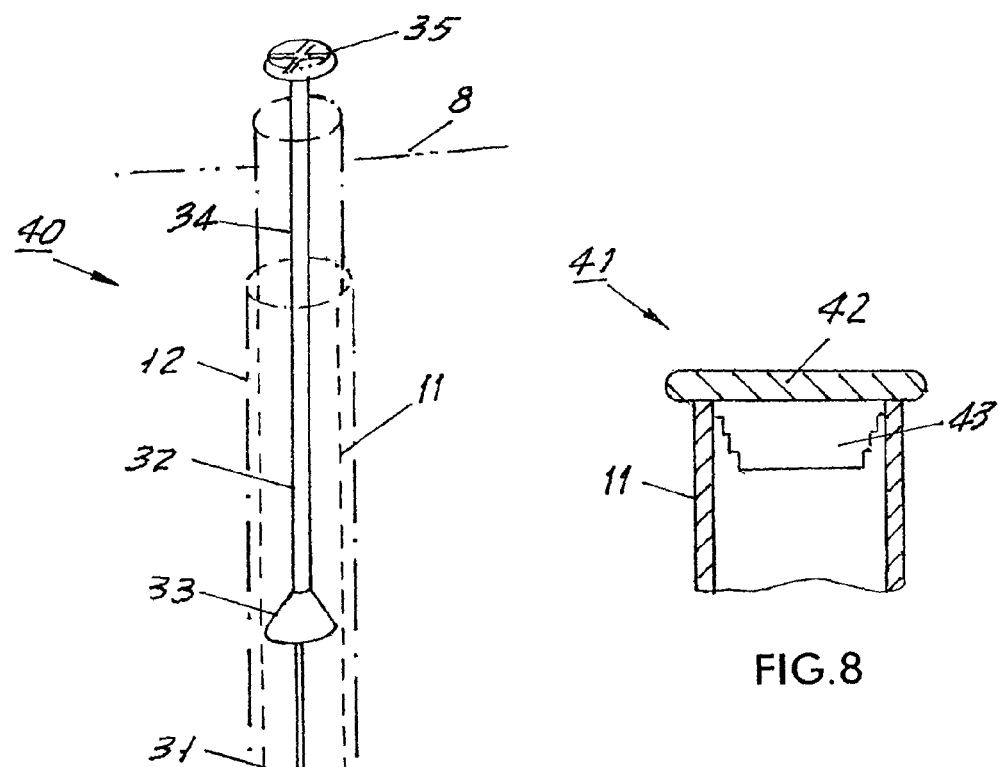
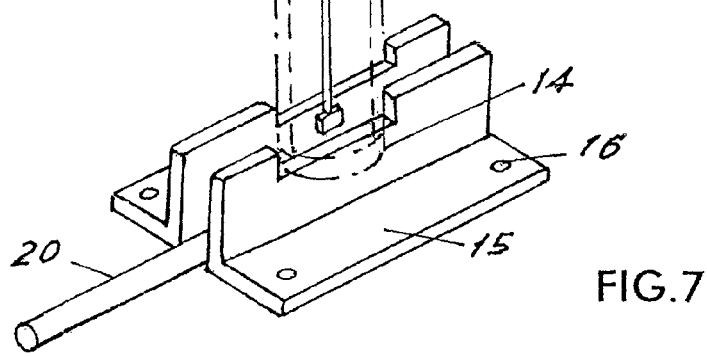
FIG.8
FIG.7

VALVE BOX, VALVE CONTROL DEVICE AND ASSEMBLY THEREOF

CROSS-REFERENCE TO RELATED APPLICATION

This is a continuation-in-part application of U.S. patent application Ser. No. 11/492,555, filed Jul. 25, 2006, by Edward Weisz, et. al. entitled VALVE BOX, VALVE CONTROL DEVICE AND ASSEMBLY THEREOF.

FIELD OF THE INVENTION

The present invention generally relates to valve boxes and associated valve control devices for accessing an underground valve from an above ground position, in particular, to a valve box, a valve control device and the assembly thereof which provide easy access to the underground valve and clear indication of the presence and position of the valve during all phases of constructions and use. The valve box may also be referred to as a water box. A water box of the invention may also remain in place after construction has been completed.

BACKGROUND OF THE INVENTION

There are many pipes such as gas pipelines, water and sewer mains typically laid and buried underground, so that municipal utility companies may supply their services, such as gas and water to or collect sewer from their customers via the underground pipelines. Generally, flow control valves are placed along the pipelines to control or actuate the supply to individual customers. And usually those control valves are located underground at the curb of an adjacent roadway.

For example, in a municipal water distribution system, water is supplied by a utility company to its customers via underground pipelines. A typical distribution system consists of two kinds of pipes: a main water conduit and service pipes. The main water conduit is also called a water main, which usually runs beneath the street and provides water to a whole subdivision. Service pipes are branched from the main, for supplying water to individual customers, such as buildings or houses. The flow of water between the main and the service pipe is controlled by an underground valve, usually termed a curb stop. The curb stop may be used as the isolation valve so as to shut off the water for repairs, nonpayment of water bills, flooded basements, and the like. The curb stop valve, typically located on the water receiving property close to the curb of the adjacent roadway and most typically beneath the front lawn or driveway, may be accessed from aboveground through a conduit known by names, such as valve can, valve box, curb box, or water box. The valve box extends from the valve up to the ground level, providing a conduit for insertion of a long-handled wrench or "key" to reach and turn the control knob of the valve. Some valve boxes may accommodate a control rod that is permanently attached to the knob of the valve. But, even this arrangement requires a special wrench or key to turn the valve on or off.

Sewer and water distribution systems are usually first to be put in place during the land development, and so are valve boxes. However, during subsequent construction activities, there are chances that different kinds of trades will move about the lots. It is not uncommon for heavy machinery to damage the installed valve boxes by running them over or inadvertently burying them, resulting in costly repairs or replacements or requiring searching for and excavating buried valve boxes, which is both time-consuming and tiresome. Further, there may be lateral force applied to the valve box due to displaced water saturated soil, rocks and/or roots. There also exists another problem in controlling the underground valve. When the valve is controlled by inserting a long-handled key through the valve box to reach a control rod attached permanently to the knob of the valve, the control rod may not necessarily stay at the centered position all the time. In many cases, it perhaps leans toward a side, consequently making it very difficult to reach and locate the top end of the control rod from above the ground level. Usually, it takes a long time to fish out the control rod, by making many attempts. There is still another problem in the prior art when the valve boxes are run over by unexpected huge or heavy machinery. Then the loads and pressures transmitted to the distal end of the valve box are so huge that the edge of the distal end will be pushed down on the pipelines underneath the box resulting in the pipelines being isolated from the location of the valve. Once this happens, it will be very difficult for it to be discovered and repaired.

Background art includes U.S. Pat. Nos. 6,802,337 and 5,738,140 which relate to valve boxes and associated valve control devices. U.S. Pat. No. 6,802,337 discloses a valve can extension comprising a tubular member having an extension riser portion at one end and an inwardly tapered portion at the other end. The inwardly tapered portion is adapted to be inserted into and frictionally engages a valve can bell housing, and the valve can extension and valve can bell housing assembly form a conduit from grade level to the bell portion, thereby making it available to complete the adjustment of the height of the valve box from above grade level with a minimum of excavation.

U.S. Pat. No. 5,738,140 relates to an adjustable-height extension stem and valve box assembly. The valve box is made up of a valve box base, a valve box lower section, a valve box upper section telescoping within the lower section and a valve box top. The extension stem comprises an upper section extending from the interior of the valve box top through a bottom opening and a lower section extending downwardly from the upper section, with the two sections being made from square hollow metal tubing such that the upper section telescopes within the lower section. However, neither of these patents addresses the above-mentioned problems.

Therefore, one object of the present invention is to provide a valve box which is damage-resistant and bury-resistant, capable of providing clear indication of the presence and position of the valve and allowing access to the valve with minimal interruption during phases of construction and service.

Another object of the present invention is to provide a valve control device used in a valve box, which is capable of locating an uncentered control rod easily and keeping the control rod in a steady centered position.

Another object of the present invention is to provide a valve box which is capable of absorbing heavy pressure from above, in a manner which prevents the pipeline underneath from being pushed down, to maximize resiliency and to minimize obstructions to access, so as to resist and to deflect lateral pressure, as described above, and pressure points on the valve box.

It is yet another object of the present invention to provide a valve box and valve control device assembly, which is kept in place during all phases of construction with minimal disruption, renders it easy to access the underground valve and provides a clear indication of the presence and position of the valve during all phases of construction with minimal disruption and servicing of the valve.

SUMMARY OF THE INVENTION

The above and other objects of the present invention are achieved by providing a strong, resilient tube which is telescoped into and thus supported by a support member. The resilient tube significantly extends vertically well above the ground level, clearly indicating the presence and the position of the curb stop valve. When it is run over by heavy machinery, breakage is inhibited and the tube will have the capability to be returned to an upright position, resisting the tendency to break. At the conclusion of the construction activities in the area of the valve box, the resilient tube, which extends above grade, may be cut or lowered to grade. Moreover, in order to make finding a control rod easier inside the housing of the valve box, the present invention proposes a new mechanism—a key head attached permanently or temporarily to a control key. The key head has a cup-shaped, and preferably a cone-shaped cavity such that even if the control rod leans to a side, it is easy to retrieve the control rod and keep it in a steady axial direction position. The key head further has an engaging portion at the slender top of the cavity, which is engageable with an engageable piece at the upper end of the control rod, sliding into it, thereby transmitting the torque exerted on the control key to the control rod and ultimately to the knob of the valve.

According to one aspect of the present invention, a valve box is provided for accessing an underground valve from an above ground location. The valve box comprises: a resilient tubular member having a central longitudinal axis, a lower end, an upper end and an outside wall; a support member having a central longitudinal axis, and a tubular section having a lower end, an upper end and a predetermined interior diameter sized for slidably receiving the lower end of said resilient tubular member; and wherein said resilient tubular member is telescoped into the tubular section of said support member until the lower end of said resilient tubular member reaches the lower end of said tubular section and the central longitudinal axis of said support member and said resilient tubular member are substantially in alignment, the resilient tubular member being sufficiently long so that the upper end of said resilient tubular member is extendable above ground. At the conclusion of construction activities, the tube may be lowered or cut to grade or at the ground.

In a further variant, a hollow plug, which is like a stent, preferably comprised of a stiff material, and more preferably, a carbon-fiber, is inserted into the tubing at a bend or deformable location for long term rigidity and strength.

In yet a further variant, a portion of the tubing which is sub-grade is thickened or otherwise reinforced with tougher, relatively more rigid compounds to strengthen the tubing and enhance its rigidity.

In still another variant, to maintain circumferential dimension stability and to minimize distortion or distension of the tubing, a high density foam material in a generally cylindrical shape is installed temporarily into the tubing. Because the foam material is to be removed from the tubing, a mechanical fastener or a rope, et al., is attached to the foam material to be used to assist in withdrawing the material from the tubing. The foam material is bendable, yet is dense enough to prevent lateral kinking and distortion of the tubing due, for example, from external force applied to the tubing, for example, caused by heaving machinery passing over the ground adjacent to the valve box.

Preferably, the support member further includes a circumferential flange disposed inwardly at the lower end of said tubular section to engage the resilient tubular member.

Preferably, the support member further includes a base having a first portion and a second portion, each of the portions has a side wall and a bottom wall forming a "L" shape, the first and second portions are respectively attached to the lower end of the tubular section and disposed in juxtaposition relative to each other so as to form a tunnel, to enable passage therethrough of a pipeline on which a valve underneath the valve box is located. Therefore, even when run over by a very heavy machinery, the base of the support member may substantially disperse the loads and pressures from above, avoiding the sometimes inevitable result that the pipeline is pushed down by an edge of the lowest end of the valve box.

Preferably, the resilient tubular member may further have a mark in alignment with the orientation of the pipeline, on its outside wall, so as to indicate the location of the pipeline conveniently.

And preferably, the first and the second portions may respectively have a plurality of holes at the bottom wall, so as to secure the first and the second portions.

According to another aspect of the present invention, a valve control device useable in a valve box for controlling an underground valve is provided. The valve control device comprises a control rod and a control key. The control rod has an upper end and a lower end, the lower end being attachable to the underground valve, and the upper end having an engageable piece. The control key includes a key head having a cup-shaped cavity and an engaging portion at the top of the cavity, a key handle and a key stem connected between the control key and the key handle. The engaging portion in the key head is shaped to engage the engageable piece of the control rod.

Preferably, the cavity is cone-shaped, the engageable piece of the control rod is a projection, and the engaging portion of the key head is a recess.

Preferably, the key head is removable from the control key.

According to yet another aspect of the present invention, there is provided a valve box and valve control device assembly comprising a valve box and a valve control device located in the valve box. The valve box includes a resilient tubular member having a central longitudinal axis, a lower end, an upper end, an interior diameter, an inside wall and an outside wall; and a support member having a central longitudinal axis, and a tubular section having a lower end, an upper end and a predetermined interior diameter sized for slidably receiving the lower end of the resilient tubular member. The valve control device includes a control rod and a control key. The control rod has an upper end and a lower end, the lower end having an attachment to the underground valve, the upper end having a projection. The control key includes a key head having a maximum exterior diameter at a lower end, a cup shaped cavity and a recess portion at the top of the cavity; a key handle; and a key stem connected between the key handle and an upper top of the key head; wherein the resilient tubular member is telescoped into the tubular section of the support member until the lower end of the resilient tubular member reaches the lower end of the tubular section and the central longitudinal axes of the members are substantially in alignment, the upper end of the resilient tubular member extending above the ground; the interior diameter of the resilient tubular member and the exterior maximum diameter of the key head are sized such that the key head is slidable along the inside wall of the resilient tubular member; and the recess portion in the key head is dimensioned to engage the projection of the control rod.

The assembly may further comprise a cover having a top cap with a bigger diameter than that of the resilient tubular member and an extended ring section attached under the cap, the extended ring section may be insertable into the resilient tubular member until the top cap abuts the upper end of the resilient tubular member. Preferably, the extended ring section has an outside wall, with a plurality of ridges tapering downwardly on the outside wall.

According to yet another aspect of the present invention, there is also provided a method of controlling an underground valve with a valve control device in a valve box, the valve control device comprising a control rod and a control key, the control rod having one end attachable to the underground valve and the other end having an engageable portion, the control key including a key head, a key handle and a key stem connected between the key head and the key handle, the key head having a cup shaped cavity and an engaging portion at the top of the cavity to engage the engageable portion of the control rod, said method comprising the steps of: extending the control key into the valve box; sliding the key head along an inside wall of the valve box downwardly until reaching the control rod; continually sliding the key head downwardly until the engaging portion in said key head engages the engageable portion of said control rod; and controlling the underground valve with the key handle.

BRIEF DESCRIPTION OF THE DRAWINGS

These and other aspects and features of the present invention and the attendant advantages will be readily apparent to those ordinary skilled in the art and the present invention will be more easily understood from the following detailed description of the preferred embodiment taken in conjunction with the accompanying drawings wherein like reference numbers represent like parts throughout the drawings.

FIG. 7 is a schematic diagram of the valve box and valve control device assembly according to a preferred embodiment of the present invention.

FIG. 8 is a cross-sectional side view of the cover according to a preferred embodiment of the present invention.

DETAILED DESCRIPTION OF THE PREFERRED EMBODIMENT

In the following detailed description, preferred embodiments of the present invention will be described. While a valve box is referred to throughout the preferred embodiments and drawings, it should be noted that a valve box is just an example of a valve can, that is, an access conduit between an underground valve and the upper end to access the valve from aboveground. The present invention can be incorporated in many valve can embodiments, and the present invention is not limited to any particular valve can described. The valve upon which the valve can is positioned may comprise any type of valves suitable for aboveground access, such as gas valves, water valves, and other flow-control devices. The invention is not limited to valve cans per se, but can also be used in other applications wherein above ground access is required to below ground devices. Such devices include, but are not limited to, electrical switches, reset breakers, and so on.

Figure 1:
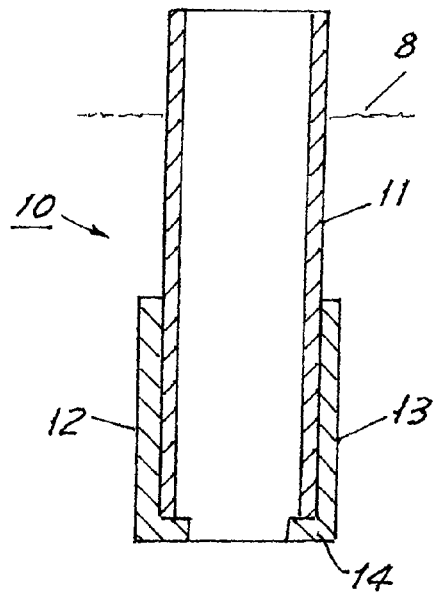
FIG. 1 is a cross-sectional side view of the valve box according to a preferred embodiment of the present invention.

Referring now to FIG. 1, the valve box 10 according to a preferred embodiment of the invention is shown in side cross-section. The valve box 10 is comprised of a resilient tube 11 and a support member 12. The central longitudinal axis of the resilient tube 11 is oriented vertically, assuming right centered on the curb stop valve. The support member 12 further includes a tubular section 13 and a circumferential flange 14 disposed inwardly at a distal end of the tubular section 13. The resilient tube 11 is telescoped into the tubular section 13 until circumferential flange 14 receives the distal end of the resilient tube 11 thus providing support to the resilient tube 11 and the central longitudinal axis of each of the resilient tube 11 and the support member 12 is positioned vertically and substantially in alignment. Meanwhile, the resilient tube 11 still has a part at its upper end extending well above the grade level 8.

It shall be appreciated by those ordinary skilled in the art that although the circumferential flange 14 is shown in FIG. 1, to act as a stop preventing the downwardly telescoping resilient tube 11 from being overextended to the point of rending the upper end of the resilient tube 11 below the grade level 8. Other kinds of stops, for example, but not limited to, spacer or O-ring gasket may also be used. Optionally, solely the friction between the outside wall of the resilient tube 11 and the inside wall of the tubular section 13 are used, without the additional aid of any stops.

The resilient tube 11 is made of a strong, resilient material, such as, but not limited to reinforced rubber, preferably the rubber has EPDM wraps on the outside, while being reinforced with several layers of nylon strands inside, so if a very heavy machinery runs over the above ground portion of the valve box, i.e., the above ground part of the resilient tube 11, the tube 11 will bend down or yield and then snap back into its upright position right after the heavy machinery goes over, rather than break up and be damaged. Although a specific type of material is given as an example, it should be appreciated by those of ordinary skill in the art that other materials, for example, other kinds of rubber compounds, may also be used, as long as the materials are flexible and at the same time sufficiently rigid.

When the resilient tube 11 extends well above the grade level 8 in phases of construction, a portion, such as one third of the resilient tube's total height is left above the grade level. The upper end of the valve box 10, such as a portion that is above grade level, aids in visibility and is not likely to be buried easily, as compared with the prior art valve box, thus providing a clear indication of the presence and the position of the underground buried valve.

Figure 9:
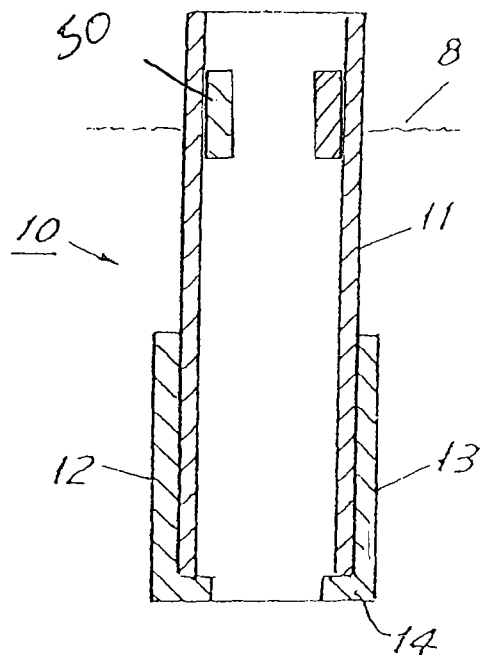
FIG. 9 shows a reinforcement device in a tubular member.

As noted above, stiffening or reinforcing the tube will inhibit damage to the tube due to forces applied to it after it has been installed and during construction. The example shown in FIG. 9 is a stent or plug 50 placed at a possible bend or high stress location, as at the region of the emergence from the ground, which inhibits bending, or if the tube bends, inhibits collapse at the bend and holds the passage through the tube open for the rod 31, described below. A stent has the characteristic that it is itself generally tubular so that the rod may be accessed therethrough. The stent is stiffened to help the tube stay as round as possible so that the rod may be accessed.

Figure 10:
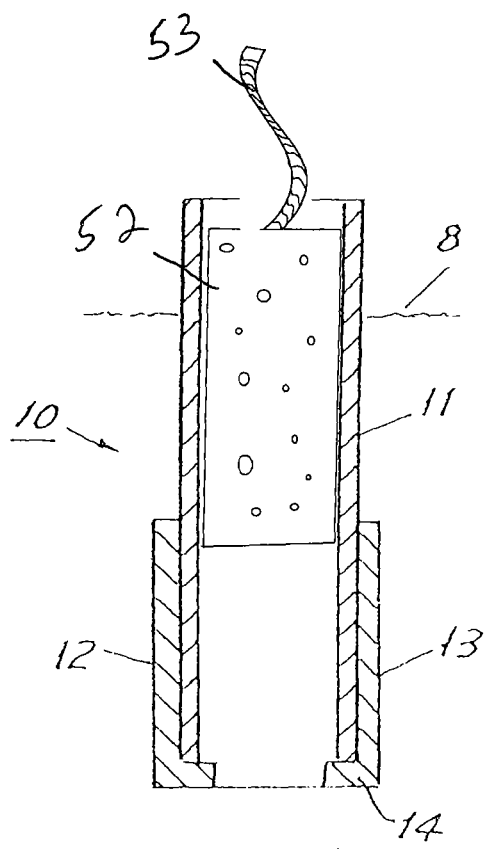
FIG. 10 shows a stiffening device in the tubular member.

Another technique to stiffen the tube is shown in FIG. 10 and is to form within the tube, or to insert pre-formed into the tube, a resilient insert which may be of a material such as foam, plastic or the like. For example, the insert may be a high density foam insert 52 shaped to the dimension of the tube and extending along a portion of its length, up to its full length or a major portion thereof to maintain circumferential, dimensional stability and minimize distortion, bending, distention and the like of the tube during construction activities. This foam insert might be surrounded by a sleeve that would aid initial formation out of the tube, and installation in and/or removal from the tube. A mechanical fastener or rope 53 is formed into and with or attached to the insert to enable removal of the insert when access through the tube is required or simply after completion of construction activities.

Figure 11:
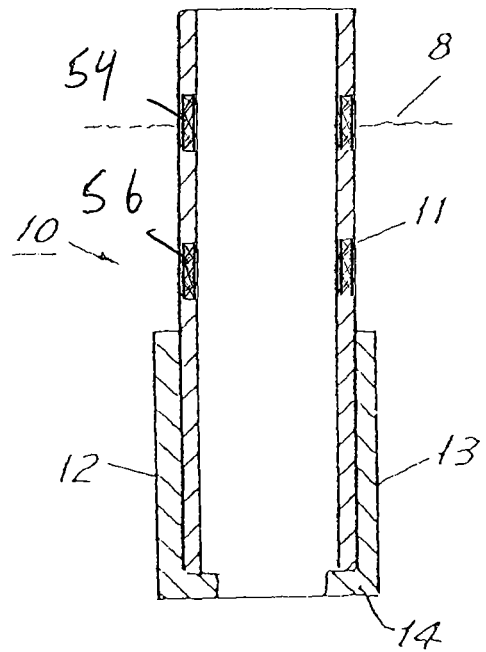
FIG. 11 shows strengthening of the tubular member.

Further, the tube may be strengthened, as in FIG. 11, by not being uniform over its entire length, but instead having at one or more subgrade locations extra thick walls or additional reinforcement 54, 56 in the wall or on it with stronger or more rigid materials than the remainder of the length of the tube.

Other techniques for strengthening the tube may be apparent to those skilled in the art of producing, installing and using such tubes.

At the conclusion of construction activities, the tube may be cut off at the grade or be lowered to end at the grade level, since it will be less likely thereafter to be affected by lateral forces or major ground movement due to construction.

Preferably, the valve box in accordance with the present invention may be installed together with the distribution system (for example, the water distribution system) at the development stage and kept in place during all phases of the following constructions, providing access to the underground valve at any stage of the construction. When the constructions work comes to an end, it is also possible that the valve box in accordance with the present invention be replaced by a generally used permanent valve box of the prior art. It is, therefore, preferable that the resilient tube 11 have a relatively large diameter in order to allow the installation of the prior art valve box through the resilient tube without any further excavation, with the tube being either trimmed thereafter to below the ground level or entirely removed afterwards.

Figure 2:
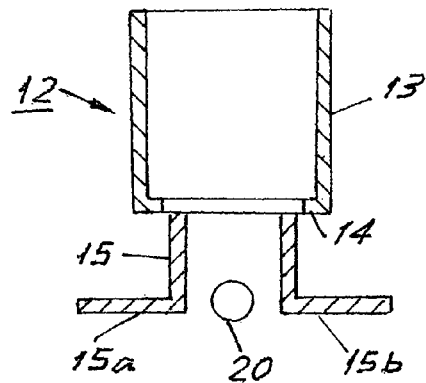
FIG. 2 is a cross-sectional side view of the support member having a base according to another preferred embodiment of the present invention.

As shown in FIG. 2, which is a cross-sectional side view of the support member 12 according to another preferred embodiment of the present invention, the support member 12 further has a base 15 attached to its distal end. The base 15 may be made from many materials, such as, but not limited to, steel angle and high strength module plastic, etc. The base 15 includes two portions, 15a and 15b, each of which has a side wall and a bottom wall which are perpendicularly connected together along one side, forming an "L" shape from the side view. The two portions 15a and 15b are disposed back to back in parallel forming a tunnel-like space beneath the valve box 10, allowing a pipeline 20 on which the underground valve is located going right through the tunnel. The location relationship between the pipeline 20 and the base 15 can be more clearly seen by referring also to FIG. 3, wherein a schematic diagram of the valve box according to an alternative preferred embodiment of the present invention is shown.

Figure 3:
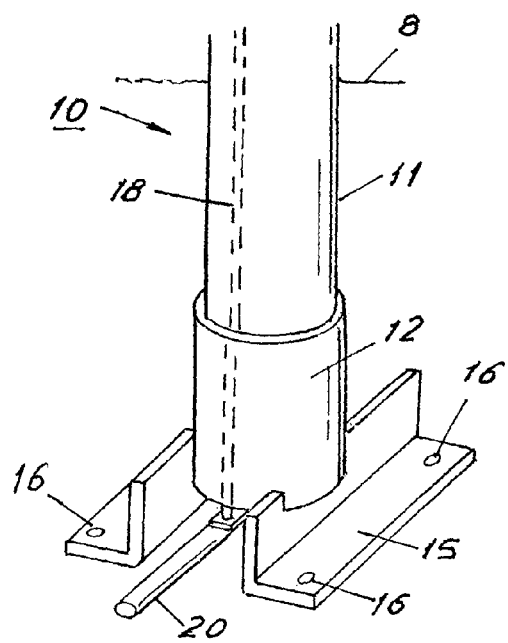
FIG. 3 shows a schematic diagram of the valve box which has a mark on the outside wall of resilient tubular member to indicate the orientation of the underneath pipeline, according to an alternative preferred embodiment of the present invention.

As shown is FIG. 3, the pipeline 20 runs through the base 15, so even when some unexpected heavy machinery runs over the valve box 10 and the massive amount of pressure is transmitted from the resilient tube 11 to the support member 12, the base 15 at the distal end of the support member 12 can significantly disperse the pressure from above, thus preventing the pipeline 20 from being pushed down.

In FIG. 3, the resilient tube 11 further has a vertical mark 18 on its outside wall, which is in alignment with the orientation of the pipeline 20 running under the valve box 10, providing a clear indication of the location and orientation of the pipeline 20. Preferably, the mark 18 may be made using bright and eye catching color, so that it can be seen and recognized easily from above the ground. Although only one mark 18 is shown in the front of the resilient tube 11 in FIG. 3, it is also applicable that marks are made in either the front or the back or both front and back of the resilient tube 11.

In addition, both of the two portions of the base 15 have at least one hole 16 on their bottom wall, as shown in FIG. 3. The holes 16 are used to fix and secure the base by fitting in matching bolts, for example. Although in FIG. 3 only two holes are shown on each of the portions, any number of holes can be provided.

Figure 4:
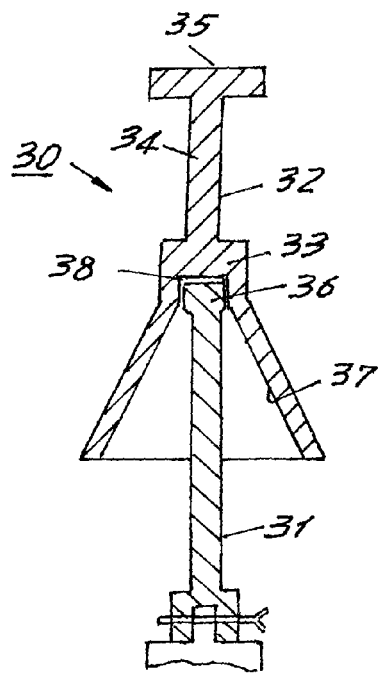
FIG. 4 is a cross-sectional side view of the valve control device according to a preferred embodiment of the present invention.

FIG. 4 shows a cross-sectional side view of the valve control device 30 according to a preferred embodiment of the present invention. The valve control device 30 is comprised of a control rod 31 which is connected to the knob of the underground valve permanently and a control key 32 which is used to control the valve by engaging with the control rod 31. The control key 32 further includes a key head 33, a key stem 34 and a key handle 35. As shown in FIG. 4, the distal end of the control rod 31 is permanently attached to the knob of the underground valve and at the upper end of the control rod 31 is a projection 36. The key head 33 has an inverted cup shaped, preferably a cone-shaped cavity 37 inside and a recessed portion 38 at the top of the cone-shaped cavity 37. The recessed portion 38 is dimensioned to fit into engagement with the projection 36 of the control rod so as to transmit torque exerted via the control key 32 to the control rod 31 and ultimately to the knob of the valve. It can be seen that in this specific example the projection 36 has a square shape. However, the shape of the projection 36 need not be square. It may also be any other shape that is suitable to engage the recessed portion 38 in the key head 33, as long as the torque coming from above can be carried on to the control rod 31. In addition, the engagement may not necessarily be limited to that between a recess and a projection, and other applicable engaging members may also be used to transmit the torque.

Figure 5:
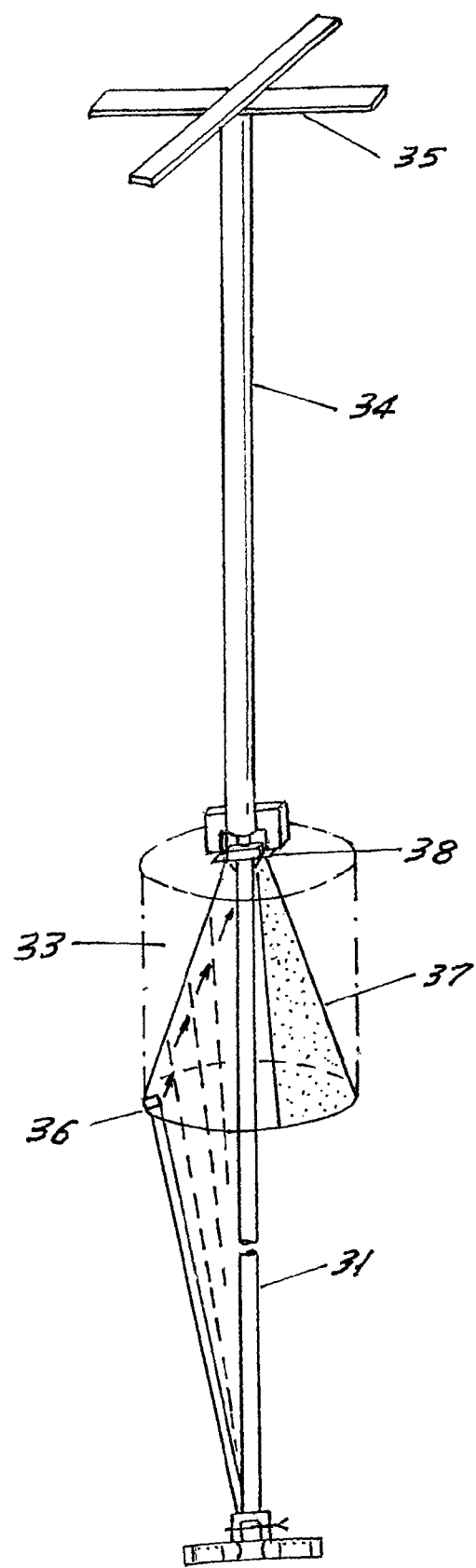
FIG. 5 is a schematic diagram illustrating the operation of the key head, in accordance with the preferred embodiment of the present invention.

For a clear understanding of the operation principle of the key head 33 and how to control the underground valve with the valve control device in accordance with the preferred embodiment of the present invention, reference is now made to FIG. 5, wherein the operation process of finding and locating the control rod 31 of the key head 33 and finally fitting it into engagement with the projection of the control rod is schematically shown. As can be seen from FIG. 5, once the key head 33 is extended downwardly enough to have reached the projection 36 at the upper end of the control rod and is continually extended downwardly, the cone shape inside the key head 33 will naturally force the top end or the projection 36 of the control rod 31 to slide upwardly along the inside wall of the cavity 37 directly into the recess portion 38 at the slender top of the cone, without having to "line up" the recess portion with the control rod, as is needed to be done in the prior art. Then, after the projection 36 of the control rod engages the recess portion 38, the underground valve can be well controlled with the key handle 35 above.

As shown in FIGS. 4 and 5, the key handle 35 has a "T" shape. However, it is not necessary that the key handle 35 have this specific shape, as any other shape, for example, cross shape etc., which are suitable in an ordinary handle, can be used. The key head 33 is not necessarily permanently connected to the key stem 34. For example, it may be fixed on the key stem 34 by bolts and when needed, the key head 33 can be removed from the key stem 34. Further, many other mechanical fixing measures are also applicable besides bolts. It should also be noted that although an outside shape of the key head 33 is shown in FIG. 4 as a cone and in FIG. 5 as a cylinder, the outside shape of the key head 33 is not limited to these shapes, and any other suitable shapes instead may be used.

Figure 6:
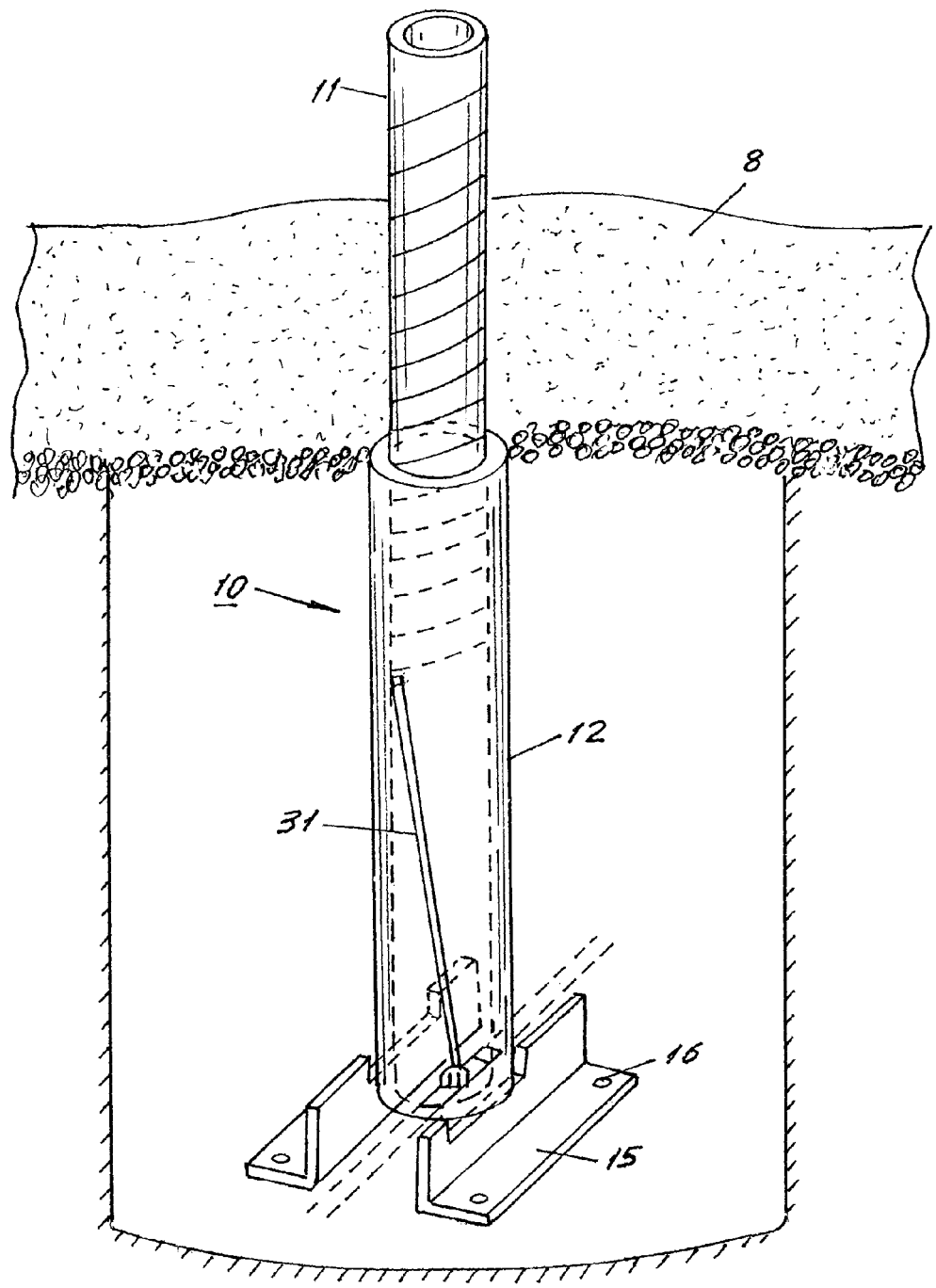
FIG. 6 shows a schematic diagram where the valve box in accordance with the preferred embodiment of the present invention is installed in place, however with the control rod having failed to be kept in the center position and leaning aside against the inside wall.

FIG. 6 is a schematic diagram which shows that the valve box 10 in accordance with the preferred embodiment of the present invention is installed in place, with part of the resilient tube 11 well above the grade level 8. However, in this diagram, the control rod 31 fails to be kept in the centered position and leans aside against the inside wall of the resilient tube 11. Under this circumstance, if the valve control device 30 is used in the valve box 10, finding and keeping the control rod 31 in the centered position will no longer be a tedious and time-consuming experience.

An example of the valve box and valve control device assembly 40 according to a preferred embodiment of the present invention is shown in FIG. 7, wherein the valve box and valve control device assembly 40 comprise both the valve box 10 and the valve control device 30 which is disposed in the valve box 10. As previously described in accordance with one preferred embodiment, the valve box 10 includes a resilient tube 11 and a support member 12. The support member 12 further includes a tubular section 13, a circumferential flange 14 disposed inwardly at a distal end of the tubular section 13 and a base 15 attached to the distal end while with holes on its bottom wall. The resilient tube 11 is telescoped into the tubular section 13 until the circumferential flange 14 receives the distal end of the resilient tube 11 thus providing support to the resilient tube 11. The central longitudinal axis of each of the resilient tube 11 and the support member 12 are positioned vertically and substantially in alignment. Meanwhile, the resilient tube 11 still has its upper end extending well above the grade level 8. The valve control device 30, disposed in the valve box 10 as previously described and shown in FIG. 4, includes a control rod 31 connected to the knob of the underground valve permanently and a control key 32. The control rod 31 has a projection 36 at the upper end. The control key 32 further includes a key head 33, a key handle 35 and a key stem 34 connected between the key head 33 and the key handle 35. The key head 33 has a cone-shaped cavity 37 inside and a recess portion 38 at the top of the cone-shaped cavity 37. The key head 33 also has a maximum exterior diameter at its lower end, which is substantially the same as or just a little bit smaller than an interior diameter of the resilient tube 11 of the valve box so that the key head 33 is slidable along the inside wall of the resilient tube 11. The recessed portion 38 is dimensioned to engage the projection 36 of the control rod 31 for the purpose of transmitting torque from above to the control rod 31 and ultimately to the knob of the valve.

Preferably, the valve box and valve control device assembly 40 according to the preferred embodiment of the present invention may further have a cover 41, as shown in FIG. 8, which is a cross-sectional side view of the cover 41. The cover 41 is comprised of a top cap 42 and an extended ring section 43 attached to the top cap 42. The top cap 42 has a larger diameter than that of the resilient tube 11 so that the top cap 42 can be received at the upper end of the resilient tube 11 when the extended ring section 43 is plugged into the resilient tube 11. As also shown in FIG. 8, preferably, the extended ring section 43 may have a plurality of ridges on its outside wall which taper downwardly so as to seal the resilient tube 11 tightly. In this way, when plugging the cover 41 into the resilient tube 11, it will easily slide in, since the tapering direction of the ridges on the extended ring section 43 complies with that of the movement, while on the other hand, when efforts are tried to pull out the cover 41, resistance will be created to resist doing so.

Although specific embodiments have been illustrated and described herein for purposes of description of the preferred embodiment, it will be appreciated by those ordinary skilled in the art that a wide variety of alternate and/or equivalent implementations calculated to achieve the same purposes may be substituted for the specific embodiment shown and described without departing from the scope of the present invention. This application is intended to cover any adaptations or variations of the embodiments discussed herein. Therefore, it is manifestly intended that this invention only be limited by the appended claims and the equivalents thereof.

What is claimed is:
1. A valve box and valve control device assembly, comprising:
  a valve box including:
    a resilient tubular member having a central longitudinal axis, a lower end, an upper end, an interior diameter, an inside wall and an outside wall;
    a support member to be received into and below the ground and having a central longitudinal axis, and a tubular section having a lower end, an upper end and a predetermined interior diameter sized for slidably receiving the lower end of said resilient tubular member;
  a valve control device located in said valve box including:
    an uncentered control rod having an upper end and a lower end, said control rod being uncentered when extending at an angle to the central longitudinal axis of the support member, the lower end of said control rod having an attachment that is pivotably attached to the underground valve, the upper end having a projection;
  a control key including:
    a key head having a maximum exterior diameter at a lower end, a cone shaped cavity defined by an interior wall of said key head and a recess portion at the top of the cavity, said interior wall being continuous from the lower end of said key head to said recess portion;
    a key handle; and
    a key stem connected between said key handle and an upper top of said key head;
  wherein said resilient tubular member is telescopable into the tubular section of said support member until the lower end of said resilient tubular member may be lowered toward said lower end of said tubular section and the central longitudinal axes of said members are substantially in alignment, the upper end of said resilient tubular member extending above the ground with said tubular member at least partially telescoped into said support member;
  the interior diameter of said resilient tubular member and the exterior maximum diameter of said key head are sized to be substantially equal to each other such that said key head is slidable along the inside wall of said resilient tubular member; and the recess portion in said key head is dimensioned to engage the projection of said control rod.

2. The assembly of claim 1, wherein the support member further includes a circumferential flange disposed inwardly at the lower end of said tubular section, to engage the resilient tubular member.

3. The valve box and valve control device assembly as defined in claim 1, wherein said key head is removable from said control key.

4. The valve box and valve control device assembly as defined in claim 1, wherein said support member further includes a base having a first portion and a second portion, each of said portions has a side wall and a bottom wall forming an "L" shape, the first and second portions are respectively positioned at the lower end of said tubular section, juxtaposed to each other so as to form a tunnel to let a pipeline on which a valve is located through.

5. The valve box and valve control device assembly as defined in claim 4, wherein said resilient tubular member further has a mark on the outside wall to indicate the location of said pipeline.

6. The valve box and valve control device assembly as defined in claim 4, wherein said first and second portions respectively have a plurality of holes at the bottom wall.

7. The valve box and valve control device assembly as defined in claim 1, further comprising a cover having a top cap with a bigger diameter than that of the resilient tubular member and an extended ring section attached under the cap, the extended ring section being insertable into said resilient tubular member until the top cap abuts the upper end of said resilient tubular member.

8. The valve box and valve control device assembly as defined in claim 7, wherein said extended ring section has an outside wall, with a plurality of ridges tapering downwardly on the outside wall.

9. The valve box and valve control device assembly of claim 1, including at least one further element for stiffening or reinforcing the tubular member against bending or deforming in shape at least at selected locations along the tubular member.

10. A method of controlling an underground valve with a valve control device in a valve box, the valve control device comprising an uncentered control rod, which is uncentered when it extends at an angle to a longitudinal axis of a tubular member associated with said valve box, and a control key, the control rod having one end pivotably attached to the underground valve and the other end having an engageable portion, the control key including a key head, a key handle and a key stem connected between the key head and the key handle, the key head having a cone shaped cavity defined by an interior wall of said key head and an engaging portion at the top of the cavity to engage the engageable portion of the control rod, said interior wall being continuous from a lower end of said key head to said engaging portion at the top of the cavity, an interior diameter of said tubular member and an exterior maximum diameter of said key head being substantially equal to each other such that said key head is slidable along an inside wall of said tubular member, said method comprising the steps of:
- extending the control key into the valve box;
- sliding the key head along an inside wall of the tubular member downwardly until reaching the control rod;
- continually sliding the key head downwardly to engage said engageable portion of said control rod and sliding said engageable portion on said interior wall until the engaging portion in said key head engages the engageable portion of said control rod; and
- controlling the underground valve with the key handle.

* * * * *